(12) United States Patent
Saarimäki et al.

(10) Patent No.: US 7,734,717 B2
(45) Date of Patent: Jun. 8, 2010

(54) SOFTWARE DISTRIBUTION VIA PEER-TO-PEER NETWORKS

(75) Inventors: Anssi Saarimäki, Oulu (FI); Kirmo Koistinen, Oulu (FI); Mika Helander, Oulu (FI); Markku Pulkkinen, Oulu (FI); Vesa Luiro, Kempele (FI); Kari Kaarela, Oulu (FI)

(73) Assignee: Nokia Corporation, Espoo (FI)

( * ) Notice: Subject to any disclaimer, the term of this patent is extended or adjusted under 35 U.S.C. 154(b) by 547 days.

(21) Appl. No.: 11/633,756

(22) Filed: Dec. 5, 2006

(65) Prior Publication Data

US 2008/0133650 A1 Jun. 5, 2008

(51) Int. Cl.
*G06F 15/16* (2006.01)
(52) U.S. Cl. .................. 709/217; 709/201; 709/203; 709/219; 709/220; 709/250; 717/178
(58) Field of Classification Search ............... 709/203, 709/220, 225, 227, 229, 250, 217, 219; 717/177, 717/178
See application file for complete search history.

(56) References Cited

U.S. PATENT DOCUMENTS

| | | | |
|---|---|---|---|
| 6,604,140 | B1 | 8/2003 | Beck et al. |
| 7,206,841 | B2 * | 4/2007 | Traversat et al. ............ 709/225 |
| 7,487,230 | B2 * | 2/2009 | Gu et al. ..................... 709/220 |
| 2002/0002605 | A1 * | 1/2002 | Honda ......................... 709/219 |
| 2002/0147771 | A1 * | 10/2002 | Traversat et al. ............ 709/203 |
| 2003/0208595 | A1 | 11/2003 | Gouge et al. |
| 2004/0083471 | A1 | 4/2004 | Nam et al. |
| 2004/0085947 | A1 * | 5/2004 | Ekberg et al. ................ 370/349 |
| 2005/0240665 | A1 * | 10/2005 | Gu et al. ..................... 709/220 |
| 2005/0267935 | A1 * | 12/2005 | Gandhi et al. ............... 709/203 |
| 2006/0026304 | A1 | 2/2006 | Price |
| 2006/0031828 | A1 | 2/2006 | Won et al. |
| 2006/0067489 | A1 | 3/2006 | Morioka |

(Continued)

FOREIGN PATENT DOCUMENTS

EP 1617333 1/2006

(Continued)

OTHER PUBLICATIONS

U.S. Appl. No. 11/566,132, filed Dec. 1, 2006, Stirbu et al.

(Continued)

*Primary Examiner*—Oanh Duong
(74) *Attorney, Agent, or Firm*—Hollingsworth & Funk, LLC

(57) ABSTRACT

Providing a software distribution service via ad hoc peer-to-peer networks involves configuring a first device to offer a peer-to-peer software distribution service that facilitates access to a plurality of programs. The peer-to-peer software distribution service is advertised via the first device using a service discovery protocol of an ad hoc peer-to-peer network. At least one query for a description of the peer-to-peer software distribution service from a target device of the ad hoc peer-to-peer network is received at the first device in response to advertising the peer-to-peer software distribution service. Downloading of a program to the target device is facilitated via the peer-to-peer software distribution service. The program is selected from the plurality of programs and capable of operating on a processor of the target device.

30 Claims, 7 Drawing Sheets

U.S. PATENT DOCUMENTS

| | | | |
|---|---|---|---|
| 2006/0179079 A1* | 8/2006 | Kolehmainen | 707/104.1 |
| 2006/0258341 A1 | 11/2006 | Miller et al. | |
| 2006/0282514 A1 | 12/2006 | Saint-Hilaire et al. | |
| 2006/0291412 A1* | 12/2006 | Naqvi et al. | 370/328 |
| 2007/0127394 A1* | 6/2007 | Stirbu et al. | 370/254 |
| 2007/0157148 A1 | 7/2007 | Chang et al. | |
| 2007/0195760 A1* | 8/2007 | Rahman et al. | 370/389 |
| 2007/0255798 A1* | 11/2007 | Schneider | 709/217 |
| 2008/0108437 A1* | 5/2008 | Kaarela et al. | 463/42 |
| 2008/0141347 A1 | 6/2008 | Kostiainen et al. | |
| 2008/0201723 A1* | 8/2008 | Bottaro et al. | 719/316 |

FOREIGN PATENT DOCUMENTS

| | | | |
|---|---|---|---|
| EP | 1705576 A1 * | 9/2006 | |
| GB | 2410150 A * | 7/2005 | |
| WO | WO 2004040918 | 5/2004 | |

OTHER PUBLICATIONS

Bouras et al., "Input here-Execute there" through networks: the case of gaming, *The 15th Workshop on Local and Metropolitan Area Networks (LANMAN 2007)*, Princeton, NJ, USA, Jun. 10-13, 2007.

Lee et al., "The u-MUSE System: An Integrated UPnP AV Home Entertainment System supporting RUI Service and Device Mobility", 2006 International Conference on Hybrid Information Technology, 2006.

"Home Media Center and Media Clients for Multi-room Audio and Video Applications", IEEE, 2004.

U.S. Appl. No. 11/593,873, filed Nov. 7, 2006, Kaarela et al.

U.S. Office Action dated Oct. 2, 2009 for U.S. Appl. No. 11/729,750, 23 pages.

U.S. Office Action dated Nov. 25, 2009 for U.S. Appl. No. 12/004,198, 17 pages.

* cited by examiner

SOFTWARE DISTRIBUTION VIA PEER-TO-PEER NETWORKS

FIELD OF THE INVENTION

This invention relates in general to computing devices, and more particularly to providing software distribution services via ad hoc, peer-to-peer networks.

BACKGROUND OF THE INVENTION

Universal Plug and Play™ (UPnP) defines an architecture for pervasive, peer-to-peer networking between all types of consumer electronics, including intelligent appliances, wireless devices, and PCs of all form factors. UPnP technologies provide a way for disparate processing devices to exchange data via proximity or ad hoc networks. The UPnP framework is designed to bring easy-to-use, flexible, standards-based connectivity to ad hoc or unmanaged networks whether in the home, in a small business, public spaces, or attached to the Internet. UPnP technologies provide a distributed, open networking architecture that leverages TCP/IP and the Web technologies to enable seamless proximity networking in addition to control and data transfer among networked devices.

The UPnP Device Architecture (UDA) is designed to support zero-configuration, "invisible" networking, and automatic discovery for a breadth of device categories from a wide range of vendors. This means a device can dynamically join a network, obtain an IP address, convey its capabilities, and learn about the presence and capabilities of other devices. The UPnP specification includes standards for service discovery, and a number of particular device control protocols (DCP) are published by the UPnP Forum. These published DCPs standardize particular types of UPnP network functions. For example, some DCPs define functions used to render audio and video via a UPnP network. Various contributors can implement these and other UPnP device and service descriptions, thus creating a way to easily connect devices into a functioning network. It is the goal of UPnP to enable home electronics to seamlessly interact, thus furthering the usefulness of such devices.

The UPnP standard includes standards for service discovery, and is mainly targeted for proximity or ad hoc networks. Various contributors publish UPnP device and service descriptions, thus creating a way to easily connect devices and simplifying the implementation of networks. UPnP is designed to work in many environments, including the home, businesses, public spaces, and on devices attached to the Internet. The UPnP standard is an open architecture that leverages Web technologies and is designed to provide ad-hoc networking and distributed computing.

UPnP and related protocols were developed primarily to allow consumers to easily assemble a home network, and to access and control devices not normally associated with networked computing. However, the flexible nature of UPnP means that it can be implemented anywhere, and can be adapted to uses not foreseen by the originators of the network framework. For example, UPnP can be used on mobile devices that normally connect to wireless provider networks. Such devices may contain secondary wired or wireless interfaces that allow the devices to communicate with other entities of home or business networks.

By their nature, mobile devices are easily transported, thus users tend to have greater access to these devices than other types of computing equipment. As the data processing capabilities and multimedia features of such devices increase, mobile devices may also be used for more advanced leisure activities, such as listening to music, watching movies, playing games, and the like. Such capabilities and activities are can often enhanced by network communications, which allow people to interact with others in shared activities. However, setup and use of network features can be daunting to some users. This perceived difficulty in using network features may prevent some from using networked entertainment functions because they may not feel the effort involved in learning how to use the network features is worthwhile to enhance discretionary activities. Therefore, providing a simple configuration and use of network technologies in support of entertainment activities is desirable.

SUMMARY OF THE INVENTION

To overcome limitations in the prior art described above, and to overcome other limitations that will become apparent upon reading and understanding the present specification, the present specification discloses a system, apparatus and method for distributing software via a data processing apparatus of an ad hoc, peer-to-peer network. In one embodiment, a method involves configuring a first device to offer a peer-to-peer-software distribution service that facilitates access to a plurality of programs. The peer-to-peer software distribution service is advertised, via the first device, using a service discovery protocol of an ad hoc peer-to-peer network. At least one query for a description of the peer-to-peer software distribution service is received at the first device from a target device of the ad hoc peer-to-peer network in response to advertising the peer-to-peer software distribution service. Downloading of a program to the target device is facilitated via the peer-to-peer software distribution service. The program is selected from the plurality of programs and is capable of operating on a processor of the target device.

In more particular embodiments, the program is configured to operate via the ad hoc, peer-to-peer network, and the at least one query may be received in response to an attempt by the target device to access an advertised service of the ad hoc, peer-to-peer network. In such a case, the at least one query includes a description of the advertised service, and the program enables the target device to use the advertised service. In other arrangements, facilitating download of the program to the target device involves downloading the program from the first device to the peer device and or from a third party computing arrangement to the target device. Downloading the program to the target device may also involve downloading the program using one or more protocols that are different from protocols of the ad hoc peer-to-peer network.

In other, more particular embodiments, the method further involves facilitating activating the program on the target device via the ad hoc, peer-to-peer network. Activating the program may involve verifying owner access rights for at least one of the first device and the target device. In some configurations, the ad-hoc, peer-to-peer network includes a Universal Plug and Play network. In another arrangement, the at least one query includes a description of a computer platform of the target device and/or a software category used for filtering a result returned in response to the query.

In another embodiment of the invention, a method involves coupling a first device to an ad hoc peer-to-peer network and discovering, via the first device, a peer-to-peer software distribution service using a service discovery protocol of the ad hoc peer-to-peer network. The peer-to-peer software distribution service is offered by a peer device and facilitates access to a plurality of programs. At least one query for a description of the peer-to-peer software distribution service is sent from the first device to the peer device in response to discovering the peer-to-peer software distribution service. A program is selected from the plurality of programs via the first device, and the program is downloaded to the first device. The downloading is facilitated by the software distribution service of the peer device.

In more particular embodiments, the program is configured to operate via the ad hoc, peer-to-peer network. In such a case, the method may involve attempting to access an advertised service of the ad hoc, peer-to-peer network by the first device, and downloading of the program to the first device occurs in response to the attempt to access the advertised service. The program enables the first device to use the advertised service. In such an arrangement, the query may include a description of the advertised service, and the method may involve invoking the program at the first device to access the advertised service.

In other, more particular embodiments, downloading the program to the first device involves downloading the program from the peer device and/or a third party computing arrangement. Further, downloading the program to the first device may involve downloading the program using one or more protocols that are different from protocols of the ad hoc peer-to-peer network. In one configuration, the method further involves activating the program on the first device via the ad hoc, peer-to-peer network, and activating the program may involve accessing an activation service of the ad hoc peer-to-peer network and/or the software distribution service of the ad hoc peer-to-peer network. Activating the program may involve verifying owner access rights for at least one of the first device and the peer device.

In another embodiment of the invention, an apparatus includes a network interface capable of communicating via an ad hoc peer-to-peer network and a processor coupled to the network interface. A memory storage device is coupled to the processor and includes instructions that cause the processor to discover a peer-to-peer software distribution service using a service discovery protocol of the ad hoc peer-to-peer network. The peer-to-peer software distribution service is offered by a peer device and facilitates access to a plurality of program. The instructions further cause the processor to select a program from the plurality of programs and download the program to the apparatus. The downloading is facilitated by the software distribution service of the peer device.

In a more particular embodiment, the instructions further cause the processor to offer a locally provided peer-to-peer software distribution service that facilitates access to a second plurality of programs; advertise, via the service discovery protocol, the locally provided peer-to-peer software distribution service; and facilitate downloading of a second program to a target device via the locally provided peer-to-peer software distribution service. The second program is selected from the second plurality of programs and capable of operating on a processor of the target device. In some arrangements, the peer-to-peer software distribution service and/or the locally provided peer-to-peer software distribution service are advertised as Universal Plug and Play devices.

In another embodiment of the invention, a computer-readable storage medium has instructions that are executable by an apparatus capable of being coupled to an ad hoc peer-to-peer network. The instructions are executable by the apparatus for performing steps that include discovering a peer-to-peer software distribution service using a service discovery protocol of the ad hoc peer-to-peer network. The peer-to-peer software distribution service is offered by a peer device and facilitates access to a plurality of programs. The steps further include selecting a program from the plurality of programs and downloading the program to the apparatus. The downloading is facilitated by the software distribution service of the peer device.

In a more particular embodiment, the steps further involve offering a locally provided peer-to-peer software distribution service that facilitates access to a second plurality of programs; advertising, via the service discovery protocol, the locally provided peer-to-peer software distribution service; and facilitating downloading of a second program to a target device via the locally provided peer-to-peer software distribution service. The second program is selected from the second plurality of programs and capable of operating on a processor of the target device.

In another embodiment of the invention, a system includes means for offering, via a first peer device, a peer-to-peer software distribution service via a service discovery protocol of an ad hoc peer-to-peer network. The generic peer-to-peer software distribution service facilitates access to a plurality of programs. The system also includes means for discovering, via a second peer device of the network, the peer-to-peer software distribution service and means for facilitating downloading of a program to the second peer device via the peer-to-peer software distribution service. In a more particular embodiment, the system also includes means for activating the program via the ad hoc, peer-to-peer distribution service.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

Figure 1:
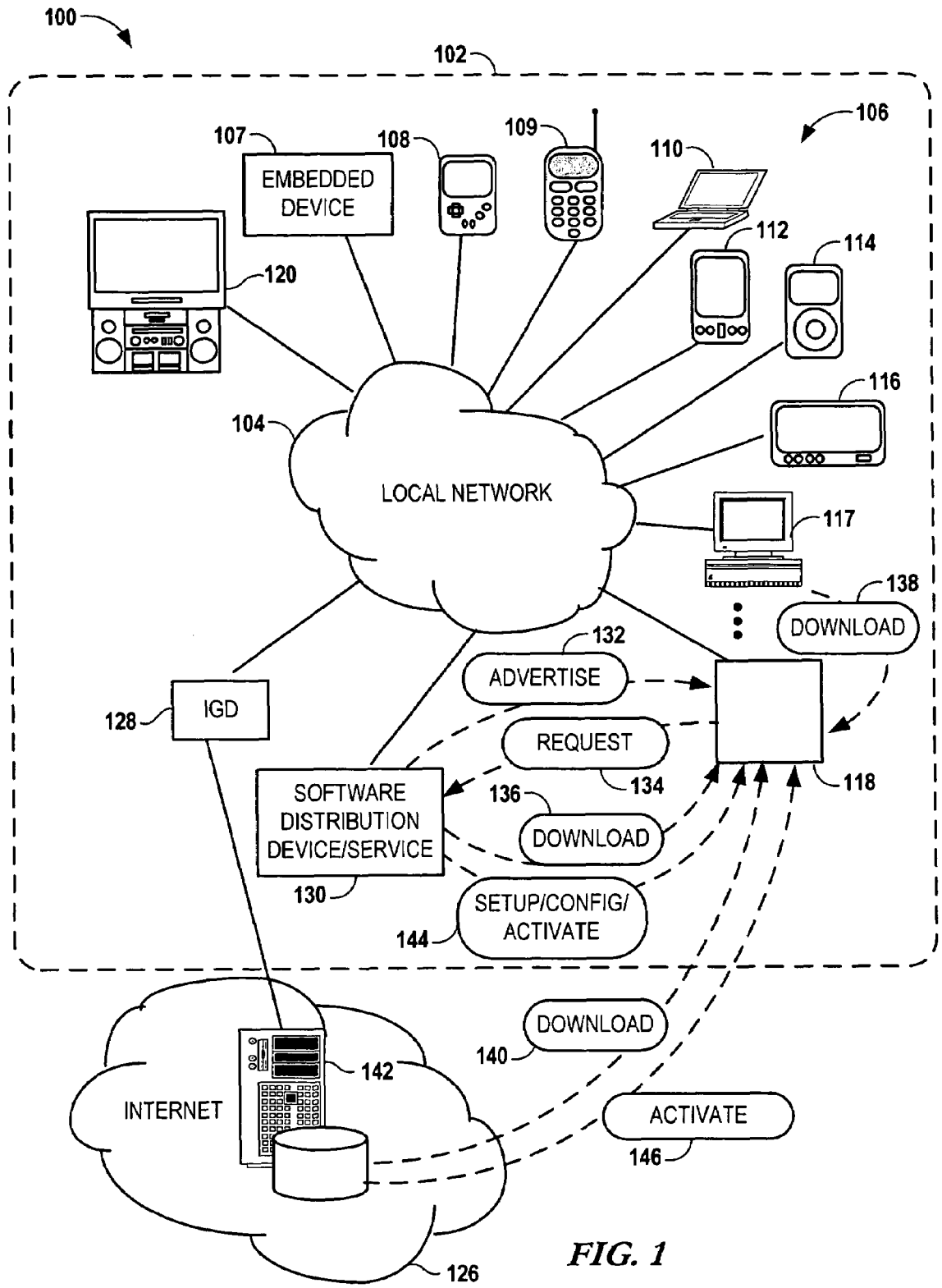
FIG. 1 is a block diagram illustrating a system according to embodiments of the invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention relates to methods, systems, and apparatus that enable software to be distributed via ad hoc, peer-to-peer networks. The "distribution" of software may involve any combination of discovery, transmission, verification, installation, purchase, activation, and maintenance of processor executable instructions between two or more computing arrangements. The software may include any type of system or user software that can be executed on a data processing device. One example of such software is a game that is made available for download via a distribution service of the peer-to-peer network. Such a game may also utilize the peer-to-peer network to advertise the use of the game and/or to use the network to exchange game play data. Although various embodiments shown herein may be described in terms of various specific types of software such as games, it will be appreciated that the invention is not so limited, and may be applied to any manner of computer-assisted activities known in the art.

In a system according to an embodiment of the invention, a generic software distribution service allows any program to be discovered and utilized via a single generic interface. Therefore, in such an arrangement, a user could be made aware of a multitude of programs available for use. In some scenarios, the software may be made available to assist a device to access another service on the peer-to-peer network. For example, a peer device may discover a multiplayer game that is advertised via the discovery protocols of the network. The multiplayer game may use the peer-to-peer network for both discovery and game play events. In order to play the game, the user device may discover and/or be automatically directed to a software distribution service that enables compatible software to be installed on the user device. In this way, the user can seamlessly utilize theretofore unknown and uninstalled capabilities that arise on the peer-to-peer network.

In one arrangement, the ad hoc, peer-to-peer network that enables the software distribution service may be a Universal Plug and Play (UPnP) network. The UPnP framework includes two layers: a general-purpose UPnP device architecture (UDA) and device-specific device control protocols (DCP). There are currently about ten standardized DCPs for various device categories. Software distribution via UPnP may involve creating a generic framework that enables users to search any available programs, such that the search would not be tied to any particular software type, device platform, licensing scheme or other categories typically associated with software distribution. A software distribution DCP may be created that would define the services, actions and state variables that a "UPnP software distribution device" would expose to the UPnP network.

In reference now to FIG. 1, a block diagram 100 illustrates an example system according to embodiments of the invention. Generally, technologies such as UPnP are designed for operating within a limited space. In FIG. 1, a physical boundary defines a local space 102. The dimensions of the local space 102 are generally confined by the underlying network protocols and media, as well as the scalability of the ad-hoc, peer-to-peer networking technologies used to facilitate software distribution. However, it will be appreciated that other ad-hoc, peer-to-peer protocols may not be limited to any physical space limitations, and so the illustration of the local space 102 is for purposes of illustration, and not of limitation.

The space 102 may include at least one local network 104 that is capable of supporting communications with one or more user devices 106. The local network 104 may include any combination of data transmission media and protocols. For example, the network 104 may utilize wired or wireless data transmission media. Similarly, devices 106 on the local network 104 may various physical and data link layer protocols to intercommunicate, including, Ethernet, FDDI, PPP, ATM, HDLC, Fibre Channel, X-10, serial/parallel point-to-point connections, etc. A number of higher layer network protocols may operate on the network 104 as well, including TCP/IP, UDP/IP, IPX, Appletalk, ICMP, ARP, SNMP, DNS, FTP, NetBEUI, etc.

The user devices 106 generally include some manner of data processing capabilities, and in particular at least some of the devices 106 are capable of obtaining and running software via the network 104. In most installations, this software includes user or system programs that are capable of running on devices 106 having general purpose data processing capabilities. Such devices 106 usually include sufficient memory (e.g., random access memory) to load in new programs that selectably alter the behavior of the device. Such devices 106 generally include (or at least have access to) some type of persistent data storage (e.g., hard disk, flash memory) that allow the devices 106 to retain changed or added software after the cycling of power.

Although the concepts described herein may be usefully applied to, general-purpose computing devices, the invention need not be limited such devices. For example, the devices 106 may include an embedded device 107, which is a limited-purpose data processing arrangement that is not, in general, extendable by the addition of new programs. However, the existing specific-purpose program contained in the embedded device 107 may be updated, modified, or replaced by a peer-to-peer software distribution service as described herein. For example, the embedded device 107 may include a "smart" UPnP appliance that performs a single function via the network 104. Such device 107 may be upgradeable (e.g., to enhance the specific function or fix bugs) by modifying flash memory that contains the operating instructions of the device 107. In such an arrangement, the device 107 may include instructions that allow it to utilize a UPnP software distribution service for obtaining and applying flash memory upgrades without requiring user intervention.

In the illustrated diagram 100, other networkable devices 106 include a gaming console 108, mobile phone 109, laptop computer 110, personal digital assistant 112, portable music player 114, tablet computer 116, personal computer 117, entertainment center 120, or any other device as represented by generic data processing device 118. Because protocols such are UPnP are applicable to a wide variety of consumer electronics, consumer electronics devices such as the entertainment center 120 include peer-to-peer network functionality. In some configurations, the consumer electronics device 120, like the embedded device 107, may have fixed functionality, such as being only capable of rendering sound or video. For example, such capabilities may be included in a flash memory program of the device 120, and thus are relatively fixed for the life of the device 120. In other arrangements, however, the device 120 may include general-purpose computer capabilities such as access to random access memory (RAM) and/or persistent storage, and as such may be able to add new programs to extend the device's capability. In either arrangement, the device 120 may be adaptable to use or provide some or all of the software distribution services described herein.

Preferably, the network 104 and its underlying protocols are designed to be generic and flexible so that many types of control or data processing functionality can be abstracted and offered as a service to other entities on the network 104. In one embodiment, the local network 104 may support one or more protocols for ad-hoc, peer-to-peer service discovery and interoperability. An example of ad-hoc, peer-to-peer protocols are those protocols used in the UPnP architecture. UPnP uses the Simple Service Discovery Protocol (SSDP) for service discovery, and is generally built on top of Internet Protocol (IP) based networks. Although concepts of the present invention may be described in terms of UPnP networks, those familiar with the applicable art will appreciate that these concepts may be applied to any manner of ad-hoc, peer-to-peer networking arrangement suitable for consumer or business networks. For example, the Service Location Protocol (SLP), Zeroconf, and Jini™ are protocols that provide functions similar to those of UPnP.

The local network 104 may be designed to service a limited physical region, as indicated by the boundary 102. The protocols used in such a local network 104 (e.g., UPnP) often assume that the network 104 will need to support only a limited number of devices operating within a reasonably small area. However, many devices on the local network 104 may benefit from information services available via an external network, particularly the Internet 126. The UPnP specification defines a special service/function known as an Internet Gateway Device (IGD) 128. The IGD function 128 can be provided by one or more of the devices 106 for purposes of provide routing and firewall services on behalf of others of the devices 106 of the local UPnP network 104. In some arrangements, a dedicated gateway device may perform the IGD functions 128 on the UPnP network 104, as well as providing traditional gateway/router functions for non-UPnP devices.

In one embodiment of the invention, one or more of the user devices 106 have specialized components 130 that enable the devices 106 to distribute software programs at least via the local network 104. This component 130 may be referred to alternately as a device or a service. In the UPnP specifications, the concept of a "device" is a logical abstraction that does not necessarily have a one-to-one correspondence to a single piece of hardware. The software distribution device/service 130 may be hosted by one or more of the network devices 106 and be advertised 132 according to service discovery protocols of the local peer-to-peer network 104. For example, devices on a UPnP network advertise via SSDP, which uses XML UDP unicast and multicast packets to advertise 132 services. In response to the advertisement 132, a device 118 may initiate further negotiations (e.g., queries) to discover particulars about the service 130. Assuming the device 118 is willing and able to utilize the software distribution service 130, the device can request 134 a software distribution function via the service 130.

One software distribution function that may be requested 134 by the device is a download 136. In the illustrated environment, the download 136 may involve data transfer directly from the service 130 to the device 118. In another example, a download 138 may be facilitated by the service 130, but the data transfer 138 occurs from another device 117 in the local network 104. The device 117 from which the download 138 originates may or may not be capable of communicating using the formats and protocols of the service 130. For example, the device 117 may be in a sleep mode, and the service/device 130 acts as a proxy that processes queries and other transactions, but causes the download 138 to originate from the device 117 after causing the device 117 to wake up. In another example, the device 117 may use an "out-of-band" mechanism to transfer data. As used herein, the term "out-of-band" generally refers to the use of one or more protocols that are not part of the protocols of the ad hoc peer-to-peer network 104. For example, although both File Transfer Protocol (FTP) and UPnP may work on top of TCP/IP networks, a simple host-to-host FTP file transfer may be considered out-of-band because such a transfer, by itself, does not utilize the UPnP protocol stack. Conversely, "in-band" mechanisms use at least a minimum set of the protocols defined for devices 106 to engage in ad hoc, peer-to-peer interactions via the network 104.

In another arrangement, a download 140 may originate from an outside network such as the Internet 126, and may be facilitated by one or more local components, including the software distribution service 130 and the IGD 128. Where the download originates from outside the network, an entity 142 providing the download 140 may not appear as a logical device on the local network 104. In one arrangement, a device such as the IGD 128 may act as a proxy for the software downloads, so that it appears that the IGD 128 is providing the download, even though the data originates from an external entity 142. The external entity 142 may include a single server or multiple, distributed hosts that provide a partial download using peer-to-peer technologies such as BitTorrent and Gnutella. Local entities 130, 117 may also participate in similar distributed software distribution.

Downloading is only one example of a software distribution function that may be facilitated by the device/service 130. Other functions are illustrated as the setup/configure/activate function 144. These functions 144 may include any actions other than downloading that cause the instructions to operate correctly on a particular device. For example, configuration may include adding and modifying files or other data to the target device. This configuration data may be used by an installer program, be read from and written to by programs to maintain states, used to store log data, etc. The functions 144 may also involve placing of files and other persistent objects in the correct places of a file system hierarchy, patching of binaries, activation of protected/encrypted code, making system file/registry changes, communication with existing software components, etc. The service 130 may directly perform the function 144, or may facilitate functions between the client 118 and another entity. An example of this is the illustrated activation 146, which performed via an entity 142 that is outside the local environment 102.

It will be appreciated that the illustrated system 100 holds many advantages over traditional ways of distributing software. In typical systems, the user must first have knowledge of the particular software, find the downloads of the software for a particular computing platform, and install the software. Where the software involves interaction with other people or devices (e.g., in a UPnP environment) the user may also have to seek out a device, user, or community in which to engage in the software activity. However, in a system according to embodiments of the invention, the existence of the target activity and the existence of other people and devices that are willing to engage in the activity may be determined by just performing service discovery via the ad hoc networks. In many situations, the users may be unable to engage in the targeted activity without additional software. In such a case, the software that facilitates the activity could be automatically downloaded on a trial or permanent basis from others in the local environment or elsewhere. This allows users to be more discerning about which software that they wish to install on their system. The decisions may therefore be based on the actual usage of such activities in environments frequented by the user, rather than based on possibly outdated or inaccurate data obtained via public forums such as the Web.

Figure 2:
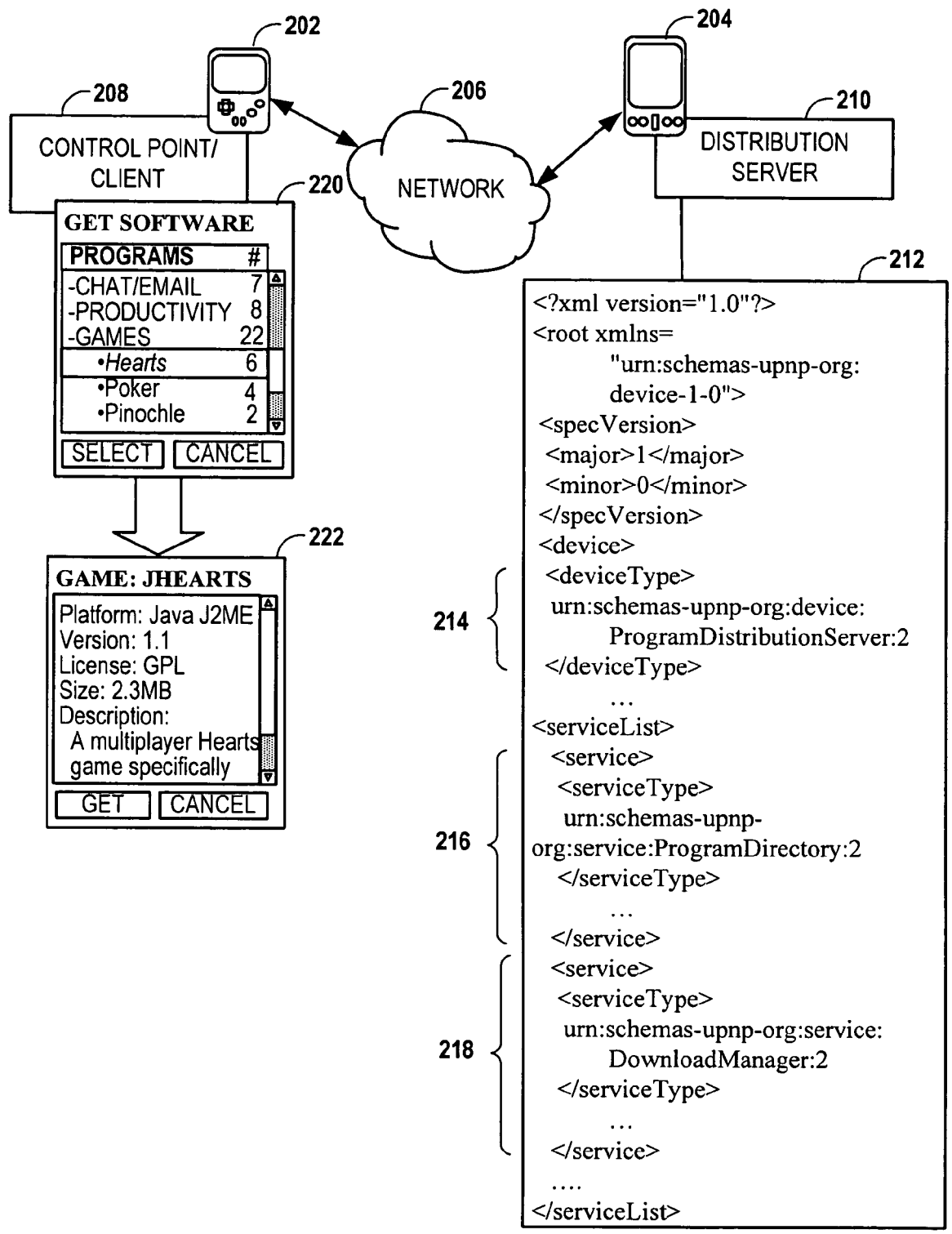
FIG. 2 is a block diagram illustrating an implementation of a software distribution service according to embodiments of the invention.

In reference now to FIG. 2, a more detailed example is presented of how software distribution can be facilitated in accordance with embodiments of the invention. Two mobile terminals 202, 204 are coupled via an ad hoc, peer-to-peer network 206. In this example, mobile terminal 202 includes a control point/client 208 and terminal 204 includes a distribution server 210 that may be configured to distribute software to mobile terminals 202, 204, or any other device of the network 206. It will be appreciated that both terminals 202, 204 may contain any combination of respective control point/ client 208 and server components 210, although in this example only the illustrated components 208, 210 are being utilized on respective terminals 202, 204. In this scenario, the terminal 204 may be acting as a UPnP device that is offering its distribution services 210 to other UPnP devices on the network 206. As such, the terminal 204 may provide an eXtensible Markup Language (XML) device description 212 in response to queries received via the network 206.

The example device description 212 includes variables that describe the device itself, such as the device type 214. Generally, a UPnP device also provides one or more services, and the illustrated device description 212 shows two example services, a program directory service 216 and a download manager service 218. The program directory service 216 facilitates querying and listing of programs that are available via the server device 214. The program directory service 216 may be able to provide listing of program using various criteria. One parameter that the client 208 may be required to submit includes computing platform.

As is known in the art, a "computing platform" is sometimes defined as the combination of central processing unit (CPU) and operating system (OS) used by a device. For example, an Intel® x86 compatible CPU may run different OSes, such as Windows®, Linux®, OS X®, Free BSD, etc. Although all programs that run natively on an x86 CPU will use the same instruction set, the programs need particular arrangements of instructions and data in order to be compatible with a particular OS. In some cases, a program may even rely on a particular patch level of the OS, and will not run correctly on incompatible patch levels. Similarly, the Linux OS has been compiled to run on a wide variety of different CPUs. However, a program compiled for Linux x86, for example, will have to be recompiled to run on Linux for a different CPU.

A number of adaptations have been created to ease the problem of using software on incompatible platforms. In some arrangements, an emulation program creates a virtual processor and OS that allows a program to run even if it was compiled for a different OS and CPU, albeit with significant performance degradation. Other adaptations, such as the Wine Project, allow programs that are compiled for a particular CPU to run in a different operating system on the same CPU. These adaptations emulate the application program interface (API) of another operating system, but because the program was compiled for the same CPU type, the program instructions can still be run directly on the CPU without any translation. Still other adaptations involve distributing programs that do not utilize CPU specific instructions at all. One form of these adaptations are scripting languages such as Perl, Python, Basic, etc., which utilize programs written in ASCII text, and the text is converted to machine language "on-the-fly" at run-time. Other adaptations, such as Java™ or Microsoft™.NET, use binary programs that are designed to run in platform independent runtime environments. Programs compatible with the run-time environment can be compiled once and run on any platform that has the run-time environment installed.

It will be appreciated that the directory service 216 may have to take into account the platform of the requesting device when processing directory requests. Even when the programs are platform independent (e.g., Java) there may be version incompatibilities that require considering the particular runtime environments of the requesting device 208. Other issues that the directory service 216 may need to take into account when distributing software include the capacity of the requesting terminal 202, 204 (e.g., memory, processor speed, graphics capability, required user input devices), licensing issues, software categories, content restrictions (e.g., parental controls, corporate IT policies), other software versions (e.g., UPnP version), OS patch level, etc. In response to various combinations of such criteria, the directory service 214 can provide a list of available programs that satisfy the criteria. The list could be "flat," or be arranged in a hierarchy, such as seen in query results screen 220.

Once a client 208 has selected a program to obtain (e.g., via selection screen 222) the software distribution device 214 will facilitate transferring data to the terminal 202, such as via a download manager service 218, thereby enabling the selected program to be installed. The download manager service 218 may be configured to facilitate downloads of configurations and/or executable images, either from the terminal 204 itself or from a third party. For example, the download manager 218 may provide authentication that allows the other terminal 202 to access a Web download site and obtain an executable. Such a downloaded executable may be good for limited purposes (e.g., only for playing with terminal 204) or for unlimited use by owner of terminal 202.

In more particular examples of downloads, the serving terminal 204 has the needed installation files stored in the file system (e.g., Java, Symbian executable objects). The server 210 provides a link to the installation files (e.g., a Uniform Resource Identifier, or URI) and receiving client 208 can download the files using a UPnP content directory service DCP. In another example, the serving terminal 204 has a lightweight run-time object (Java or web browser scripts) stored in the file system. The server 210 provides an HTTP link to the run-time files, and receiving client 208 can download them using a UPnP content directory service DCP. In another example, server 210 provides an Internet HTTP URI to the installation files to the client 208, and the device 202 can download them using suitable program.

The software distribution server 210 generally at least allows other network entities such as the control point component 208 to view and select programs that are available via the terminal 204. The control point component 208 may also be able to view, query, and use the services offered by this and other software distribution servers 210. The control point 208 (or another component of the client device 202) may automatically invoke the distribution service 210 in response to an attempt to use a service. For example, the client terminal 202 may be owned by a traveler who is enduring a long wait at an airport. He/she takes the mobile terminal 202 (or any other suitable device) and starts a "game manager" function that lists networked games that are locally hosted via devices on an ad hoc, peer-to-peer network. The game manager allows the user of terminal 202 to select one of the games, such as via a user interface component (e.g., gaming control point).

As part of this gaming selection function, the game manager may also discover that a particular piece of client software is needed to play the game. The particulars of the client game software may be provided as part of the service discovery protocols of the game manager (e.g., by specifying an executable name). The game manager may be manually or automatically configured to search for instances of the program distribution server 214 using the software distribution client 208. Upon finding such devices 214, the client 208 can submit a specific query for the gaming client, and proceed to download and install the necessary software.

It will be appreciated that, in the example scenario described above, software can be distributed rather widely and easily. However, software is often governed by copyright and licenses that place legal restrictions on distribution. In other cases, software contains digital rights managements (DRM) feature that prevent software distributions under certain circumstances. Thus the distribution device 214 may be required to process certain software distributions differently, depending on the licensing and/or DRM associated with the software. For some software distribution scenarios, such as Open Source software, freely distributing copies of the program is an acceptable use under the Open Source license. However, most proprietary models of software distribution require that at least some of the end users purchase software. As will be discussed below, a distribution device 214 may be able to enforce acceptable limits on the distribution of non-free software.

Referring to the gaming example above, the gaming software of the hosting device (e.g., terminal 204) may be licensed such that certain, limited versions of the program can be freely distributed. This scenario is not unlike shareware distributions that are commonly used to promote paid software products. Such freely distributed versions of the programs contain limitations that make the free versions less useful than the paid for versions. Nonetheless, these limited versions are useful in that they allow people to try out the software before making a financial commitment to purchase. In relation to network games such as in the present scenario, the use of limited capability client versions may also be useful in order to promote network game play, and can ultimately increase the base of paying users. In such a case, the software vendor may want to allow anybody to freely connect and play with a registered user, yet be unable to otherwise use the software without paying.

A limited and freely distributed version of a proprietary program may be distributed by preparing or modifying an executable of the licensed program, such by overwriting a block in a binary file, so that execution of the program is limited. Such a limitation may only allow use for a particular time period or for a predetermined number of plays. Another modification may involve restricting with whom the user of the limited version can play. For example, unique data of the client terminal 202 and hosting terminal 204 could be combined (e.g., forming a hash value) and added to the executable or other files. This value is checked before and/or during network play so that network interaction can only occur between these two devices, and the terminal 202 will be unable to connect to other players without paying (unless those other players also have a properly licensed version). Other limitations that may be built into the distributed executables may include disabling single player mode, limiting play to a certain game levels, causing the game to operate in a reduced mode (e.g., reduced network bandwidth, reduced graphical display, etc.), preventing saving of games or other persistent data, use of embedded advertising in the free product, etc. It will be appreciated that the concepts described in relation to the network gaming example are equally applicable to other non-gaming applications.

Generally, where versions of software are distributed to a client terminal 202 via the distribution device 214 are limited to a particular use, it may be preferable to allow the user of the client terminal 202 to easily free up memory if the user does not intend to use the program again. For example, if the program is active only for a limited time, it could be automatically deleted (or moved to an overwritable cache) to free up available storage. A software distribution client 208 may be configured to perform these clean up actions. The client 208 may also assist the user to obtain unlimited versions of the software, such as via interaction with a billing entity and a software activation entity.

Implementing rights management into a software distribution service may address concerns related to illegal distribution of some types of software. Another concern that may need to be addressed in implementing the distribution service is that of security. For example, certain types of software (often referred to as "malware") may become installed unintentionally on a user device. In some cases, malware may consume resources for unwelcome or nefarious purposes, intentionally damage data and/or hardware, attempt to access and divulge private data, etc. In order to prevent the spread of malicious or unwanted software, the underlying platform may implement security measures, such as only allowing digitally signed and authenticated software to be installed. Similar measures may also be implemented in the service 210 and/or client 208. For example, any software must be authenticated by a trusted source before the client machine 202 installs it. In other cases, a user interface of the control point 208 may require user confirmation before any software is installed.

The device description 212 may include specific services related to both security and rights management. Similarly, the client/control point 208 may include provisions to ensure any distribution server 210 is to be trusted. For example, transactions with the server 210 may involve exchanging authentication keys that can be independently verified. An a priori configuration (e.g., shared encryption key, manual authorization) may also be used, although such a priori configurations are typically less-user friendly than an automated authentication from a trusted verification source.

The systems described herein may be implemented using any combination of networking technologies known in the art. In particular, the UPnP framework may be particularly useful in providing gaming activities via network entities. In reference now to FIG. 3, a block diagram 300 illustrates an example implementation of a UPnP software distribution architecture according to an embodiment of the invention. The diagram 300 includes two compatible peer devices 302, 304 that may interact via a UPnP network 306. The devices 302, 304 typically represent separate hardware components; however there may be some arrangements where the devices 302, 304 are virtual devices that share hardware with each other and with other components of the network 306.

As illustrated, the device 302, 304 may contain compatible functional components 308, 310, 312, 314, 338, 340, 342, 344 that allow each device 302, 304 to facilitate software distribution (e.g., acting as a server) and find/use programs (e.g., acting as a client). It will be appreciated that it is not necessary for the devices 302, 304 to each include all of the listed functionality to form a usable system. For example, some devices may be configured to act only as clients, such as by disabling distribution server functionality or by not having such functionality installed to begin with. Similarly, the functional components may be distributed across multiple physical devices yet operate in an integrated fashion as if on a single device. For example, peer device 302 may be comprised of a handheld game controller acting as the UPnP control point 338, and this controller communicates via Bluetooth with a cellular phone acting as a UPnP client 340.

Functional components 308, 310, 312, 314 of peer device 304 will be described in greater detail below. It will be appreciated that the same functionality may also be provided by analogous components 338, 340, 342, 344 of device 302. The illustrated device 304 includes a UPnP software distribution control point 308, a UPnP software distribution client 310, and a UPnP software distribution server 312. Each of the components 308, 310, 312 are configured to communicate via UPnP protocols, and as such will implement the UPnP Device Architecture (UDA). Also associated with these components 310, 312, 314 is a UPnP software distribution device control protocol (DCP) that defines the actions and state variables of the various interactions between components 310, 312, 314.

The UPnP software distribution control point 308 may provide functions similar to other UPnP control points, such as the UPnP audio video (AV) control point. Generally, the control point 308 includes the user interface and application logic that allows a user to discover the services of other software distribution devices on the UPnP network 306. The UPnP software distribution control point 308 may also provide other control functions for activities associated with finding, selecting, buying, downloading, configuring, and running software. The control point 308 can invoke the UPnP software distribution DCP to perform these actions in order to get a desired response. In some applications, it is desirable to hide the UPnP functionality from the user as much as possible. In such a case, the control point 308 may only provide minimal user interface functions, such as reporting critical errors, or requiring confirmation of software installation as required by security policy settings.

The software distribution client device 310 is a UPnP device that provides UPnP interface for connecting to software distribution servers. The client device 310 may operate in response to operations of the control point 308, other user interface devices, or in response to other, non-user initiated events. Generally, the client device 310 interacts with software distribution servers 312, 342 to at least initiate downloads of programs, and may also handle the other actions such as configuration and activation needed to enable those programs to run.

The UPnP software distribution server 312 acts as a central point for accessing specific programs 314 that are available via the device 304. More specifically, the server 312 is a UPnP device with the "software distribution" service exposing the available programs 314. The server device 312 may also handle the actions and maintain the state variables associated with installing the programs 314. The server device 312 may use a registry or some other mechanism for tracking and categorizing various programs 314 that are available via the peer device 304. Generally, those programs may include both UPnP programs 317 and non-UPnP programs 319. In particular, the distribution of UPnP programs 317 can be integrated with the discovery of UPnP services, including UPnP services hosted by a device 304 that also stores programs that enable other devices to use the service.

In one configuration, the software distribution server 312 may be implemented using extensions to the UPnP Content Directory Service (CDS). The CDS is a UPnP Audio Video (AV) service template, identified as "urn:schemas-upnp-org:service:ContentDirectory:1," where the numeral "1" signifies the latest version. The CDS is a server-side interface used for accessing media storage devices. The CDS provides lookup functions such as "browse" and "search" that allows devices to discover individual data objects stored on the media servers and access that content. The current CDS interface may be extended to include software object repositories. Alternatively, the software distribution server 312 may use a service template that is modeled after the CDS, but includes features unique to software distribution, including features that address rights management and security concerns.

Where the software distribution server 312 is configured as a CDS or CDS-like service, a standard AV Control Point component may be used (or adapted) to view and select software made available via the system 300. One difference between an AV Control point and one adapted for use with the system 300 is that a standard AV Control Point sends data from a media storage device to an AV Media Renderer device where it is perceived by a user. The software distributed by the system 300 is not necessarily "rendered" to a user, but is generally installed on a computer. However, components such as the clients 310, 340 may be adapted to resemble a UPnP Media Renderer. In such a case, software installation components could be transferred via the network 306 in a manner similar to the sending of digital media from a media storage device to a rendering device, and therefore can be made compatible with some or all of the existing UPnP AV framework.

The components 308, 310, 312, 314, 338, 340, 342, 344 may interact for such purposes as service discovery 316, cataloging 318, query/search 320, as well as initiation 322, download 324 and configuration 326 of programs. In some situations, runtime data 328 of the installed program may be communicated between components 308, 310, 312, 314, 338, 340, 342, 344. For example, once a program is installed and successfully running, it may signal 328 a success at runtime so that programs involved in the installation can terminate and log the installation as a success. Such data may also be communicated by out-of-band mechanisms 329, either via a network or via interprocess communication within the devices 302, 304. Such out of band mechanisms may include using dedicated network connections, alternate network access mechanisms and media, streaming data, multicast data, writing to a remote database, etc.

It will be appreciated that the downloading function 324 may involve downloads directly between the devices 302, 304 and/or by using the devices 302, 304 as proxies. However, out-of-band upload/download mechanisms 330, 332 may also be used, such as for accessing programs from a database 334 and/or adding programs to the database 334. Another illustrated out-of-band upload/download mechanisms includes distributed uploads/downloads 356, 358 which generally allows downloads from multiple peer devices 360 at the same time. Technologies such as BitTorrent allow this type of distributed uploads/download 356, 358 by distributing a file that contains metadata about the files to be shared, and about a server (or "tracker") that coordinates the file distribution. The tracker assists the downloading device in discovering the peers 360 that can download a portion of the requested data. It will be appreciated that the peers 360 may include any combination of hosts inside of and outside of the UPnP network 306, including Internet hosts.

In another configuration, the distributed uploads/downloads 356, 358 may be enabled using entirely UPnP network protocols. In such an example, the UPnP distribution clients 310, 340 and servers 312, 342 may be extended to act as BitTorrent-type peers, without requiring the use of a tracker. Such UPnP distribution would only require the querying of devices on the local UPnP network to discover distributed download devices/services, although the availability of software in such a case could be extended to entities outside the network by the use of a proxy, such as a UPnP IGD (see FIG. 1).

Figure 4:
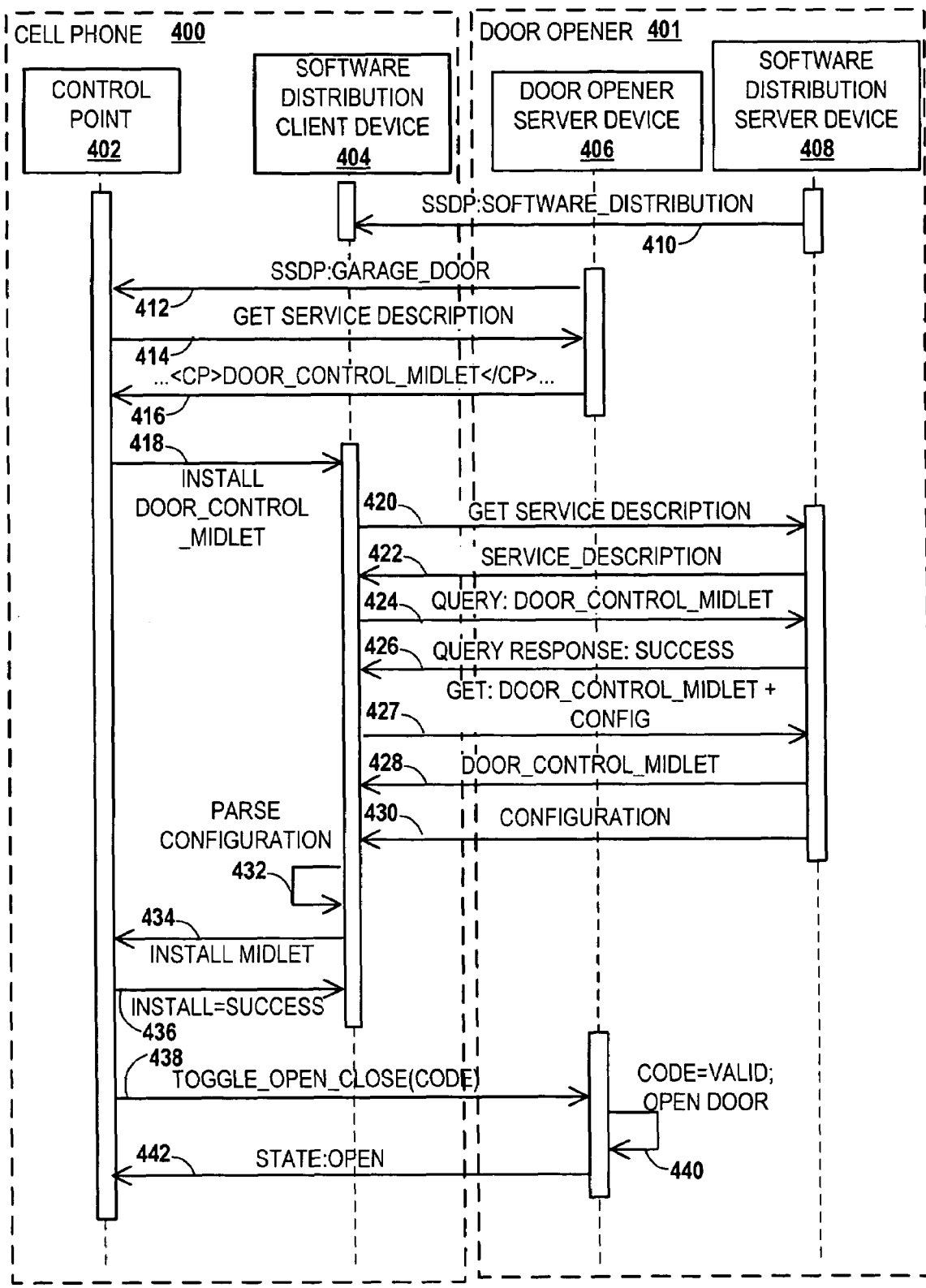
FIG. 4 is a sequence diagram of example software distribution service interactions according to embodiments of the invention.

In reference now to FIG. 4, a sequence diagram illustrates an example use of software distribution services according to an embodiment of the invention. In the scenario illustrated in FIG. 4, a user has a cellular phone 400 and garage door opener 401 that are capable of communicating via an ad-hoc, peerto-peer network such as UPnP. The cell phone contains a control point 402 and software distribution client device 404. The control point 402 in the illustrated scenario assumed to be able to handle communications between any types of UPnP services, although in some configurations the actions shown being performed by the control point 402 might be handled by more than one physical and/or logical control point device.

The door opener 401 includes a door opener service device 406 that allows control of the door hardware. The opener device 406 may include typical actions associated with a door controller, including opening and closing the door, turning off and on lights, locking and unlocking the door, etc. Other, less typical, actions may also be performed via the device 406, such as setting safety shutoff sensitivity, calibrating sensors, etc. The opener device 406 may also be able to transmit data associated with the hardware, such as open/closed state, number of cycles, etc. Such data may be useful outside of the usual remote control applications. For example, a person could have a UPnP alarm clock next to their bed that detects the door state and indicates via the clock display that the door is open, thereby alerting the person that the door is open before they go to bed.

In some cases, the capabilities of the door opener device 406 may be exploited by commonly available software (e.g., a browser) that can use control commands advertised by the device 406. However, in order to utilize some functions, the control point 402 may need specialized software. For example, the door 401 may utilize dynamic security codes that prevent somebody from wirelessly intercepting open/close commands and later using those commands to open the door. Therefore, the opener 401 (or some other entity of the network) may include a software distribution server device 408 that distributes a software component to authorized devices. Such a component can be used by the authorized device to generate the correct codes. It will be appreciated distribution server 408 may implement additional security measures to prevent unauthorized access to the control code software, but such security measures are outside the scope of the present discussion.

Figure 3:
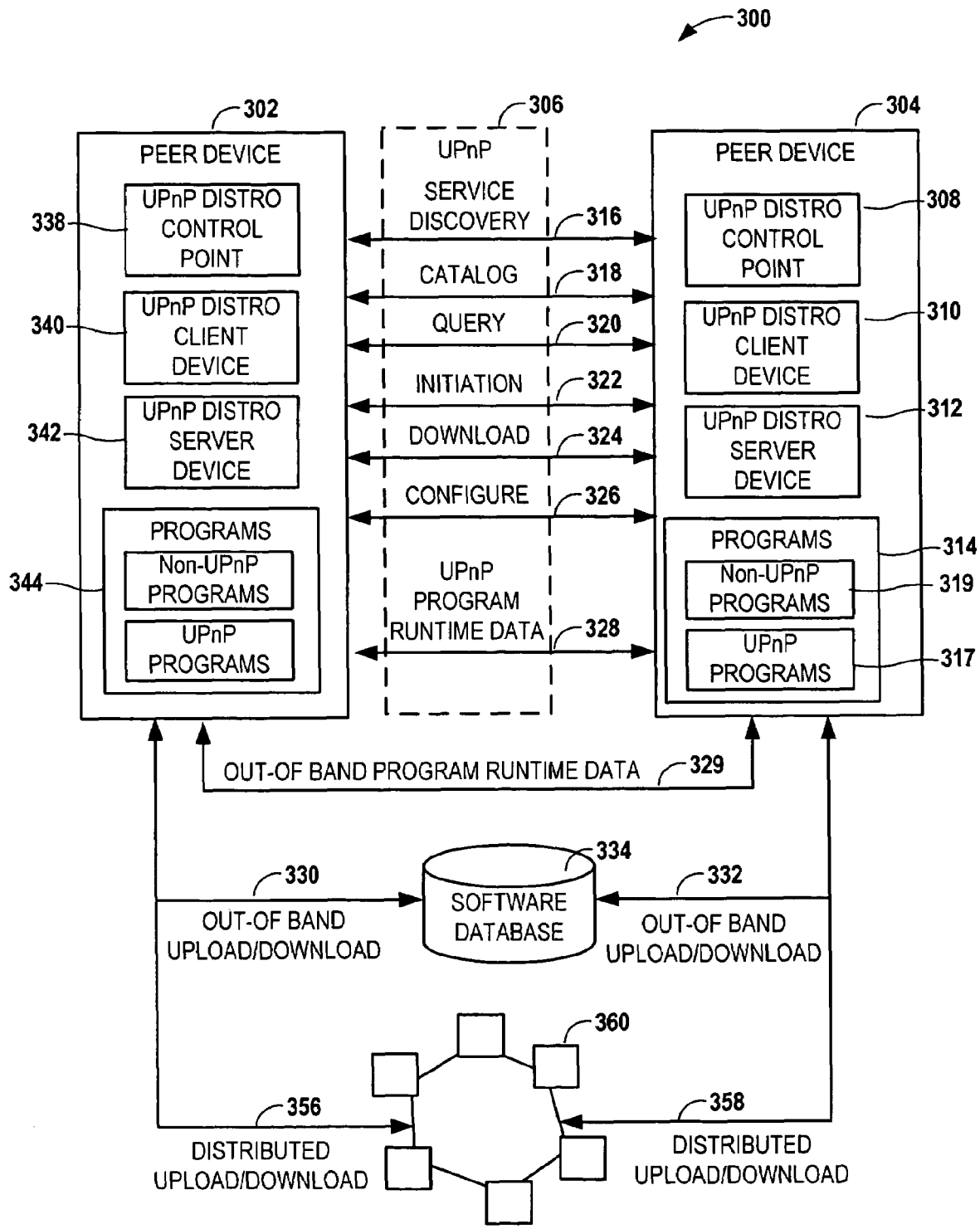
FIG. 3 is a block diagram illustrating a UPnP software distribution architecture according to embodiments of the invention.

The software distribution client 404 and server 408 may include functionality as described in relation to UPnP components shown in FIG. 3. At any time, the software distribution client 404 may receive a service discovery message 410 from one or more of the software distribution service devices 408. Similarly, the control point 402 may receive a service discovery message 412 from the door opener service 406. In response to the service discovery message 412, the control point 402 may, either automatically or at the prompting of a user, request 414 a service description. In response, the opener server 406 returns a service description 416 that includes a description of a Java "midlet" that may be used by the device in order to utilize features of the opener server 406.

After the control point 402 has determined the capabilities of the door opener service 406, it may send a request 418 to the software distribution client 404 asking to install the required component. In response, the software distribution client 404 obtains a service description 420, 422 from the software distribution server, and determines via a query 424, 426 that the server 408 has the available component. The software distribution client 404 then downloads 427, 428 suitable executables, as well as a configuration 430 that may be needed for the particular device 400 in which the midlet 428 is to be installed. The software distribution client 404 parses 432 the configuration 430 (or otherwise utilizes it, e.g., executes it using a scripting language) and installs the midlet 434. The midlet need not be installed 434 in the control point 402 as shown, but may be installed in other programs, via an OS, etc.

Whatever method is used to install the software 434, the installation success or failure may be communicated in a message 436 to software distribution client 404. Thereafter, the control point 402 (or other software, including the downloaded component 428 itself) can be used to send a control message 438. Because of the installed component 434, the security code is correct, and the opener server device 406 can open 440 the door and signal the state 442 to the control point 402.

The example scenario illustrated in FIG. 4 is only one demonstration of how a peer-to-peer software distribution service might be used. Other messages and sequences may be utilized in place of or in addition to those illustrated. Also, the software distribution need not be limited to control point devices. Any of the components 402, 404, 406, 408 may be able to take advantage of a generic software distribution service. For example, the manufacturer of the door opener 401 may provide updates that include stronger encryption for use by the server 406. An IGD or other locally connected device may act as a proxy to access the manufacturer's server and inform the network when these updates are made available. The updates could be applied to the server device 406 via the IGD, or could be applied to the distribution server device 408, which then automatically updates the other components 402, 404, 406 that may use these updates. Even the software distribution components 404, 408 may be able to update themselves by accessing another distribution component.

Many types of apparatuses may be able to engage in software distribution activities as described herein. Mobile devices are particularly useful in this role because they are portable user interface devices, and therefore may be called upon to control a wide variety of networked components. In reference now to FIG. 5, an example is illustrated of a representative mobile computing arrangement 500 capable of carrying out operations in accordance with embodiments of the invention. Those skilled in the art will appreciate that the exemplary mobile computing arrangement 500 is merely representative of general functions that may be associated with such mobile devices, and also that landline computing systems similarly include computing circuitry to perform such operations.

The processing unit 502 controls the basic functions of the arrangement 500. Those functions associated may be included as instructions stored in a program storage/memory 504. In one embodiment of the invention, the program modules associated with the storage/memory 504 are stored in non-volatile electrically-erasable, programmable read-only memory (EEPROM), flash read-only memory (ROM), hard-drive, etc. so that the information is not lost upon power down of the mobile terminal. The relevant software for carrying out conventional mobile terminal operations and operations in accordance with the present invention may also be transmitted to the mobile computing arrangement 500 via data signals, such as being downloaded electronically via one or more networks, such as the Internet and an intermediate wireless network(s).

The mobile computing arrangement 500 may include hardware and software components coupled to the processing/control unit 502 for performing network data exchanges. The mobile computing arrangement 500 may include multiple network interfaces for maintaining any combination of wired or wireless data connections. In particular, the illustrated mobile computing arrangement 500 includes wireless data transmission circuitry for performing network data exchanges.

This wireless circuitry includes a digital signal processor (DSP) 506 employed to perform a variety of functions, including analog-to-digital (A/D) conversion, digital-to-analog (D/A) conversion, speech coding/decoding, encryption/decryption, error detection and correction, bit stream translation, filtering, etc. A transceiver 508, generally coupled to an antenna 510, transmits the outgoing radio signals 512 and receives the incoming radio signals 514 associated with the wireless device. These components may enable the arrangement 500 to join in one or more networks 515, including mobile service provider networks, local networks, and public networks such as the Internet.

The mobile computing arrangement 500 may also include an alternate network/data interface 516 coupled to the processing/control unit 502. The alternate network/data interface 516 may include the ability to communicate on secondary networks using any manner of data transmission medium, including wired and wireless mediums. Examples of alternate network/data interfaces 516 include USB, Bluetooth, Ethernet, 802.11 Wi-Fi, IRDA, etc. In the illustrated example, the alternate network interface is coupled to a local, ad hoc, peer-to-peer network 517. These alternate interfaces 516 may also be capable of communicating via the networks 515.

The processor 502 is also coupled to user-interface elements 518 associated with the mobile terminal. The user-interface 518 of the mobile terminal may include, for example, a display 520 such as a liquid crystal display and a camera 522. Other user-interface mechanisms may be included in the interface 518, such as keypads, speakers, microphones, voice commands, switches, touch pad/screen, graphical user interface using a pointing device, trackball, joystick, vibration generators, etc. These and other user-interface components are coupled to the processor 502 as is known in the art.

The program storage/memory 504 typically includes operating systems for carrying out functions and applications associated with functions on the mobile computing arrangement 500. The program storage 504 may include one or more of read-only memory (ROM), flash ROM, programmable and/or erasable ROM, random access memory (RAM), subscriber interface module (SIM), wireless interface module (WIM), smart card, hard drive, or other removable memory device. The storage/memory 504 of the mobile computing arrangement 500 may also include software modules for performing functions according to embodiments of the present invention.

In particular, the program storage/memory 504 includes a UPnP stack 530 that provides baseline UDA functionality for communicating with devices of the peer-to-peer network 517. This stack 530 may be implemented as common libraries and/or as a standalone process. Alternatively, some or all UPnP applications on the system 500 may implement their own UPnP stacks. These UPnP applications may include a software distribution server device 532, a software distribution client device 534, a software distribution control point 536, and UPnP-aware programs 538. Other programs 540 that are not natively UPnP-aware may also be capable of utilizing UPnP functions by way of a plug-in API 542. Generally, developers often include a plug-in API 542 as a way for third parties to extend the functionality of the base program 540. A plug-in can utilize this API 542 to include UPnP functions that allow the programs 540 to be integrated with the functionality of the other UPnP software distribution modules 532, 534, 536, 538 for purposes such as software updates and for adding new software.

The gaming server and client 532, 534 may need to access persistent or non-persistent data storage for caching and or storing programs, configuration, and state data. An example of this storage requirement is shown as the subscriptions database 546 and the software database 548. The subscriptions database 546 may include persistent data related to recurring updates requested by peer devices. These subscriptions may be added to the database 546 automatically in response to previous installations serviced by the server device 532, or based on requests for software update services from devices that discover this subscription capability via descriptions of the server device 532. Generally, the server device 532 (or some other component) may regularly query known sources of updates, and push out the updates to any subscribing peer devices.

The program database 548 may contain the files needed to distribute software, including executable images, configurations files/scripts, and other metadata distributed with the programs. In some instances the program database 548 may contain a reference to such data, so that the data need not be stored locally. The program database 548 may utilize a subscription service (e.g., via the subscription database 546 and server device 532) to ensure that data and/or references to data are kept up to date.

In many cases, the software of the device 500 that distributed by the UPnP distribution functionality may include a native UPnP interface, such as represented by the stack 530. However, legacy programs (shown here as other applications 550) that provide or use functions of the peer-to-peer network 517 may still be useful, but certain restrictions (e.g., copyright concerns, no access to source code) may prevent adapting those programs to utilize UPnP, and in particular to use UPnP software update functionality provided locally (e.g., via server component 532) or via other devices of the network 517. It may still be possible to adapt such programs 550 to use UPnP through a helper program or some other means. For example, some applications 550 may be able to receive commands and configurations via an interprocess communications (IPC) facility 552 of the operating system. These IPC mechanisms may include system messaging, sockets, pipes, middleware (e.g., CORBA, Java RMI), shared files, command line arguments, etc. Alternatively, a virtual environment, here represented by wrapper component 554, may set up a simulated environment in which to run the application 550. In this way, system or kernel calls can be intercepted, and events directed to hardware (e.g., network interfaces 516, 508) and/or operating system APIs can be intercepted and translated to conform to UPnP protocols.

Figure 5:
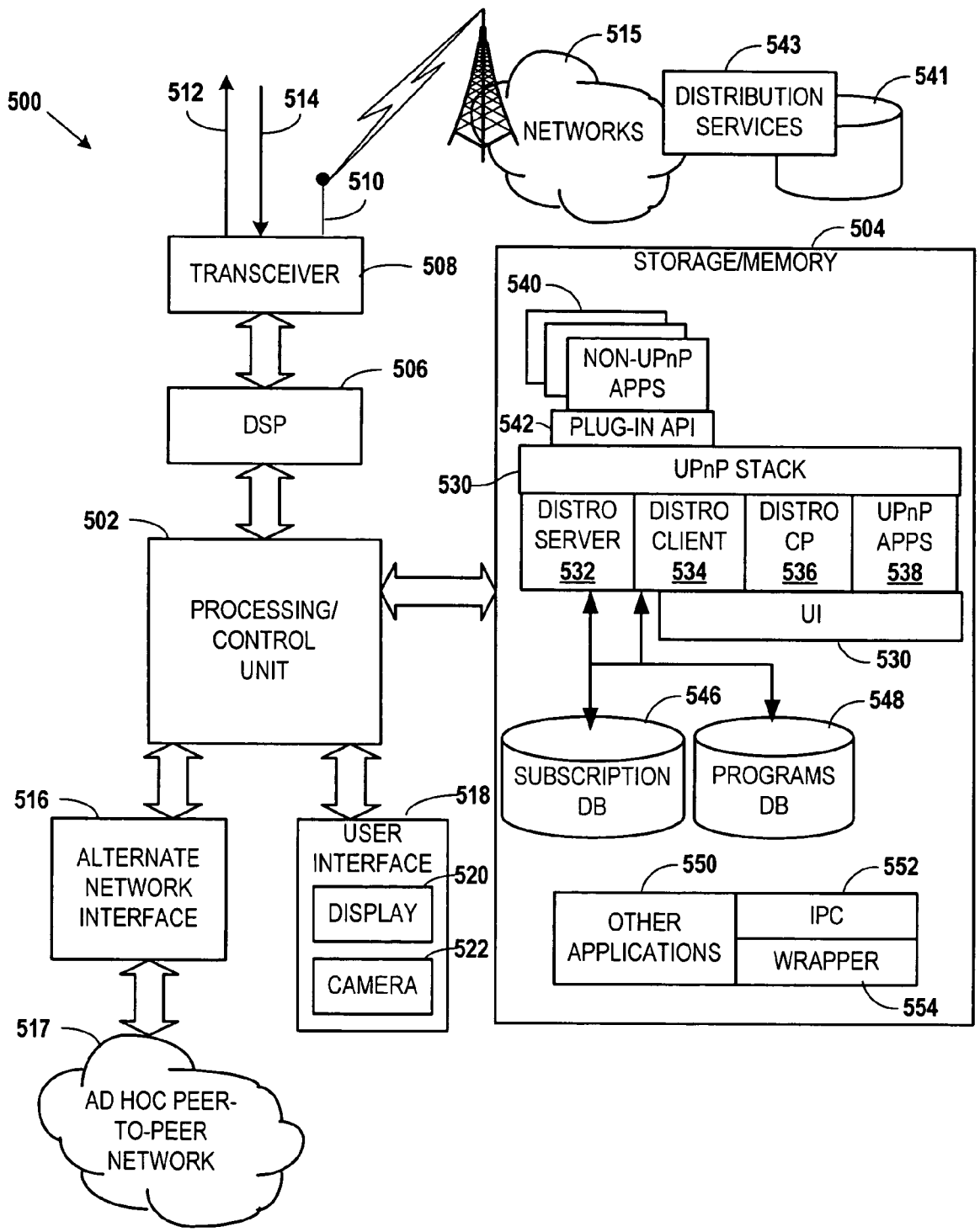
FIG. 5 is a block diagram of a mobile device according to embodiments of the invention.

The mobile computing arrangement 500 of FIG. 5 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Figure 6:
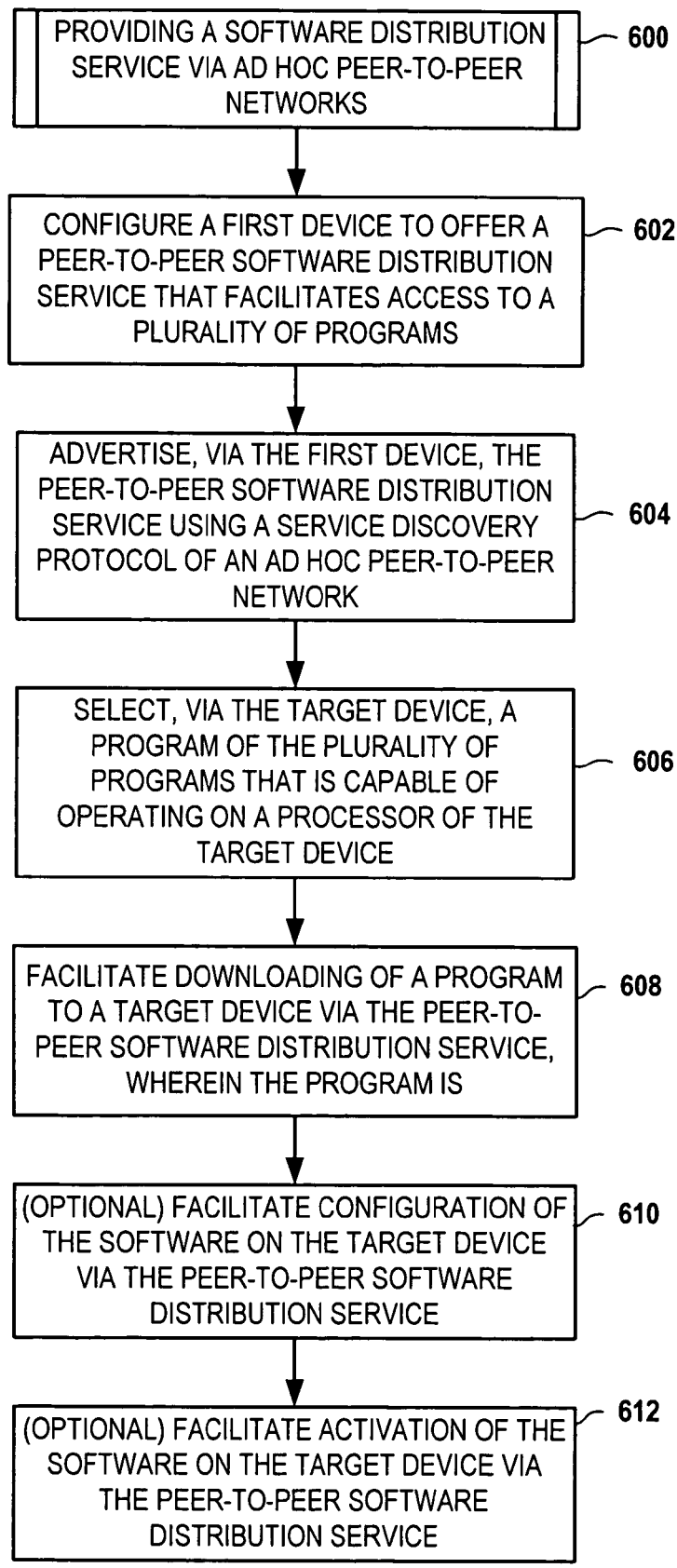
FIG. 6 is a flowchart illustrating a method for providing a software distribution service via ad hoc, peer-to-peer networks according to embodiments of the invention.

In reference now to FIG. 6, a flowchart illustrates a procedure 600 for providing a software distribution service via ad hoc peer-to-peer networks. A first device is configured 602 to offer a peer-to-peer software distribution service that facilitates access to a plurality of programs. The first device advertises 604 the peer-to-peer software distribution service using a service discovery protocol of the ad hoc peer-to-peer network. The target device selects 606 a program of the plurality of programs that is capable of operating on a processor of the target device. Downloading of a program to a target device is facilitated 608 via the peer-to-peer software distribution service. Optionally, configuration of the software on the target device is facilitated 610 via the peer-to-peer software distribution service, and activation of the software on the target device is optionally facilitated 612 via the peer-to-peer software distribution service.

Figure 7:
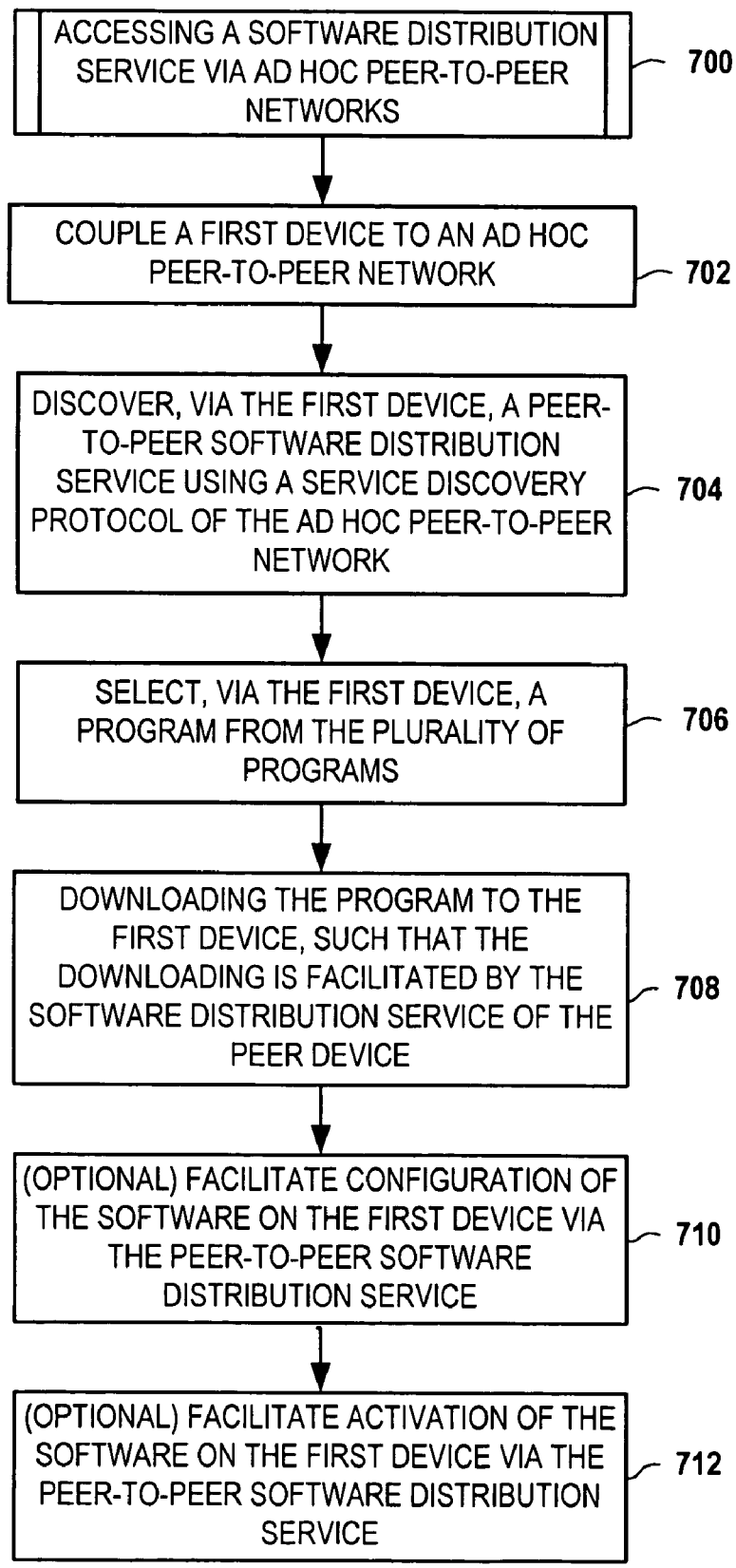
FIG. 7 is a flowchart illustrating a method for using a software distribution service via ad hoc, peer-to-peer networks according to embodiments of the invention.

In reference now to FIG. 7, a flowchart illustrates a procedure 700 for accessing a software distribution service via ad hoc peer-to-peer networks. A first device is coupled 702 to an ad hoc peer-to-peer network. The device discovers 704 a generic peer-to-peer software distribution service using a service discovery protocol of the ad hoc peer-to-peer network. The peer-to-peer software distribution service is offered by a peer device and facilitates access to a plurality of programs. The first device selects 706 a program from the plurality of specific programs of the peer device. The program is downloaded 708 to the first device. The downloading 708 is facilitated by the software distribution service of the peer device. The program may be downloaded 708 directly from the peer device to the first device, or the peer device may act as a download proxy for an external network (e.g., the Internet). In other situations, the download 708 may originate from another entity of the peer-to-peer network using in-band or out-of-band connections. In such a case, the peer device may facilitate the download 708 by, for example, providing a URI that allows the first device to independently access and download 708 the program. Configuration of the software on the first device is optionally facilitated 710 via the peer-to-peer software distribution service, and activation of the software on the first device is optionally facilitated 712 via the peer-to-peer software distribution service. In situations where the first device has no access to external networks, the peer device may also provide access to other external network services besides download on behalf of the first device. Such services may include registration, configuration 710, authentication, purchase, and activation via the external networks. Even where the download 708 is between devices of the local network, the peer device may still be called upon to provide external network proxy services (e.g., registering, configuring authenticating, activating) on behalf of the first device.

It will be appreciated that various alternates to the illustrated ad hoc, peer-to-peer software distribution services may be implemented. For example, when a UPnP software provisioning/distribution service is registered, the service may notify other UPnP services that can utilize application distribution service. For example, when a new game (or other program) is registered with the software distribution service, the gaming device/service is notified so that the gaming device may include the installation URI of the game to the list of games. This installation URI may be used in subsequent service discovery messages sent via the gaming service and/or a software distribution service that works in conjunction with the gaming service.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method, comprising:
   configuring a first device to offer a peer-to-peer software distribution service that facilitates access to a plurality of programs;
   advertising, via the first device, the peer-to-peer software distribution service using a service discovery protocol of an ad hoc peer-to-peer network; and
   receiving, at the first device, at least one query for a description of the peer-to-peer software distribution service from a target device of the ad hoc peer-to-peer network in response to advertising the peer-to-peer software distribution service, wherein the at least one query includes a description of a computer platform of the target device;
   filtering a result returned in response to the query based on the description of the computer platform, wherein the result includes a list of programs selected from the plurality of programs that are capable of operating on a processor of the target device;
   facilitating, in response to the at least one query, downloading of a program to the target device via the peer-to-peer software distribution service, wherein the program is selected from the list of programs and capable of operating on the processor of the target device.

2. The method of claim 1, wherein the program is configured to operate via the ad hoc, peer-to-peer network.

3. The method of claim 2, wherein the at least one query is received in response to an attempt by the target device to access an advertised service of the ad hoc, peer-to-peer network, wherein the at least one query includes a description of the advertised service, and wherein the program enables the target device to use the advertised service.

4. The method of claim 1, wherein facilitating download of the program to the target device comprises downloading the program from the first device to a peer device.

5. The method of claim 1, wherein facilitating download of the program to the target device comprises facilitating downloading the program from a second device to the target device.

6. The method of claim 1, wherein downloading the program to the target device comprises downloading the program using one or more protocols that are different from protocols of the ad hoc peer-to-peer network.

7. The method of claim 1, further comprising facilitating activating the program on the target device via the ad hoc, peer-to-peer network.

8. The method of claim 7, wherein activating the program comprises verifying owner access rights for at least one of the first device and the target device.

9. The method of claim 1, wherein the ad-hoc, peer-to-peer network comprises a Universal Plug and Play network.

10. The method of claim 1, wherein the at least one query includes a software category used for filtering the result returned in response to the query.

11. A method, comprising:
    coupling a first device to an ad hoc peer-to-peer network;
    discovering, via the first device, a peer-to-peer software distribution service using a service discovery protocol of the ad hoc peer-to-peer network, wherein the peer-to-peer software distribution service is offered by a peer device and wherein the peer-to-peer software distribution service facilitates access to a plurality of programs;
    sending, from the first device to the peer device, at least one query for a description of the peer-to-peer software distribution service in response to discovering the peer-topeer software distribution service, wherein the at least one query includes a description of a computer platform of the first device;

filtering a result returned in response to the query based on the description of the computer platform, wherein the result includes a list of programs selected from the plurality of programs that are capable of operating on a processor of the first device;

selecting, via the first device in response to the description of the peer-to-peer software distribution service received from the peer device, a program from the list of programs; and downloading the program to the first device, wherein the downloading is facilitated by the software distribution service of the peer device.

12. The method of claim 11, wherein the program is configured to operate via the ad hoc, peer-to-peer network.

13. The method of claim 12, further comprising attempting to access an advertised service of the ad hoc, peer-to-peer network by the first device, and wherein the downloading of the program to the first device occurs in response to the attempt to access the advertised service, and wherein the downloaded program enables the first device to use the advertised service.

14. The method of claim 13, wherein the at least one query includes a description of the advertised service.

15. The method of claim 13, further comprising invoking the program at the first device to access the advertised service.

16. The method of claim 11, wherein downloading the program to the first device comprises downloading the program from the peer device.

17. The method of claim 11, wherein downloading the program to the first device comprises downloading the program from a third party computing arrangement.

18. The method of claim 11, wherein downloading the program to the first device comprises downloading the program using one or more protocols that are different from protocols of the ad hoc peer-to-peer network.

19. The method of claim 11, further comprising activating the program on the first device via the ad hoc, peer-to-peer network.

20. The method of claim 19, wherein activating the program comprises accessing an activation service of the ad hoc peer-to-peer network.

21. The method of claim 19, wherein activating the program comprises accessing the software distribution service of the ad hoc peer-to-peer network.

22. The method of claim 19, wherein activating the program comprises verifying owner access rights for at least one of the first device and the peer device.

23. The method of claim 11, wherein the ad-hoc, peer-to-peer network comprises a Universal Plug and Play network.

24. The method of claim 11, wherein the at least one query includes a software category used for filtering the result returned in response to the query.

25. An apparatus, comprising:
a network interface capable of communicating via an ad hoc peer-to-peer network;
a processor coupled to the network interface; and
a memory storage device coupled to the processor, the memory storage device including instructions operable by the processor to cause the apparatus to,
discover a peer-to-peer software distribution service using a service discovery protocol of the ad hoc peer-to-peer network, wherein the peer-to-peer software distribution service is offered by a peer device and wherein the peer-to-peer software distribution service facilitates access to a plurality of programs;

send, to the peer device, at least one query for a description of the peer-to-peer software distribution service in response to discovering the peer-to-peer software distribution service, wherein the at least one query includes a description of a computer platform of the apparatus;

filtering a result returned in response to the query based on the description of computer platform, wherein the result includes a list of programs selected from the plurality of programs that are capable of operating on the processor of the apparatus;

select a program from the list of programs in response to the description of the peer-to-peer software distribution service received from the peer device; and download the program to the apparatus, wherein the downloading is facilitated by the software distribution service of the peer device.

26. The apparatus of claim 25, wherein the peer-to-peer software distribution service is advertised as a Universal Plug and Play device.

27. The apparatus of claim 25, wherein the instructions are further operable by the processor to cause the apparatus to:
offer a locally provided peer-to-peer software distribution service that facilitates access to a second plurality of programs;
advertise, via the service discovery protocol, the locally provided peer-to-peer software distribution service; and
facilitate downloading of a second program to a target device via the locally provided peer-to-peer software distribution service, wherein the second program is selected from the second plurality of programs and capable of operating on a processor of the target device.

28. The apparatus of claim 27, wherein the locally provided peer-to-peer software distribution service is advertised as a Universal Plug and Play device.

29. A computer-readable storage medium having instructions stored thereon which are executable by an apparatus capable of being coupled to an ad hoc peer-to-peer network for performing:
discovering a peer-to-peer software distribution service using a service discovery protocol of the ad hoc peer-to-peer network, wherein the peer-to-peer software distribution service is offered by a peer device and wherein the peer-to-peer software distribution service facilitates access to a plurality of programs;

sending, to the peer device, at least one query for a description of the peer-to-peer software distribution service in response to discovering the peer-to-peer software distribution service, wherein the at least one query includes a description of a computer platform of the apparatus;

filtering a result returned in response to the query based on the description of the computer platform, wherein the result includes a list of programs selected from the plurality of programs that are capable of operating on a processor of the apparatus;

selecting a program from the list of programs in response to the description of the peer-to-peer software distribution service received from the peer device; and downloading the program to the apparatus, wherein the downloading is facilitated by the software distribution service of the peer device.

30. The computer readable medium of claim 29, wherein the instructions are further executable by the apparatus for performing:

offering a locally provided peer-to-peer software distribution service that facilitates access to a second plurality of programs;

advertising, via the service discovery protocol, the locally provided peer-to-peer software distribution service; and facilitating downloading of a second program to a target device via the locally provided peer-to-peer software distribution service, wherein the second program is selected from the second plurality of programs and capable of operating on a processor of the target device.

\* \* \* \* \*